(12) United States Patent
Gallancy et al.

(10) Patent No.: US 11,431,494 B2
(45) Date of Patent: Aug. 30, 2022

(54) PASSWORDLESS SECURITY SYSTEM FOR DATA-AT-REST

(71) Applicant: Atakama LLC, New York, NY (US)

(72) Inventors: Daniel H. Gallancy, New York, NY (US); Erik A. Aronesty, New York, NY (US); Dimitri Nemirovsky, New York, NY (US)

(73) Assignee: Atakama LLC, New York, NY (US)

( * ) Notice: Subject to any disclaimer, the term of this patent is extended or adjusted under 35 U.S.C. 154(b) by 503 days.

(21) Appl. No.: 16/106,564

(22) Filed: Aug. 21, 2018

(65) Prior Publication Data
US 2019/0288840 A1    Sep. 19, 2019

Related U.S. Application Data

(60) Provisional application No. 62/643,539, filed on Mar. 15, 2018.

(51) Int. Cl.
*H04L 9/08*  (2006.01)
*G06F 21/60*  (2013.01)
*H04W 12/04*  (2021.01)
*H04L 9/30*  (2006.01)

(52) U.S. Cl.
CPC .......... *H04L 9/0894* (2013.01); *G06F 21/602* (2013.01); *H04L 9/085* (2013.01); *H04L 9/30* (2013.01); *H04W 12/04* (2013.01)

(58) Field of Classification Search
CPC ......... H04L 9/0894; H04L 9/085; H04L 9/30; H04L 2209/80; H04L 9/0897; H04L 9/3073; H04L 9/3255; G06F 21/602; H04W 12/04; H04W 12/001
See application file for complete search history.

(56) References Cited

U.S. PATENT DOCUMENTS

| | | | | |
|---|---|---|---|---|
| 9,489,522 | B1 * | 11/2016 | El Defrawy | G06F 21/64 |
| 10,025,910 | B2 * | 7/2018 | Paty | G16Z 99/00 |
| 10,476,672 | B2 * | 11/2019 | Robertson | H04L 9/085 |
| 10,867,057 | B1 * | 12/2020 | Knas | H04L 9/085 |

(Continued)

FOREIGN PATENT DOCUMENTS

| | | |
|---|---|---|
| EP | 2606604 | 6/2013 |
| EP | 2947812 | 11/2015 |

OTHER PUBLICATIONS

"International Application Serial No. PCT US2019 016593, International Search Report dated Apr. 29, 2019", 4 pgs.

(Continued)

*Primary Examiner* — Trang T Doan
(74) *Attorney, Agent, or Firm* — Schwegman Lundberg & Woessner, P.A.

(57) ABSTRACT

The disclosed embodiments include a passwordless method for securing data-at-rest. The method includes encrypting and/or decrypting data with a cryptographic key. For example, the encrypted data can be stored on a non-transitory computer memory of a first device. The method can include generating key shards based on the cryptographic key, which can be reconstituted from the key shards, and distributing the key shards among devices such that the encrypted data is secured at the first device because the first device is incapable of decrypting the encrypted data due to an absence of the cryptographic key.

23 Claims, 10 Drawing Sheets

(56) References Cited

U.S. PATENT DOCUMENTS

| | | |
|---|---|---|
| 2009/0014030 A1 | 1/2009 | De Jong et al. |
| 2010/0037055 A1* | 2/2010 | Fazio .................... H04L 9/3255 713/171 |
| 2010/0150341 A1* | 6/2010 | Dodgson ................. H04L 9/085 713/150 |
| 2011/0022883 A1* | 1/2011 | Hansen ................... H04L 9/085 713/168 |
| 2011/0213975 A1* | 9/2011 | Sorniotti ............. G06Q 10/107 713/169 |
| 2012/0243687 A1* | 9/2012 | Li .......................... H04L 9/085 380/277 |
| 2012/0321086 A1* | 12/2012 | D'Souza ............... H04L 9/0825 380/278 |
| 2013/0013931 A1* | 1/2013 | O'Hare ................... H04L 9/085 713/189 |
| 2013/0177157 A1* | 7/2013 | Li .......................... H04L 9/085 380/277 |
| 2013/0212393 A1* | 8/2013 | D'Souza ............. H04L 63/0823 713/171 |
| 2013/0283065 A1* | 10/2013 | Orsini ................. H04L 63/0823 713/193 |
| 2014/0281520 A1* | 9/2014 | Selgas ................. G06F 21/6209 713/165 |
| 2016/0212109 A1* | 7/2016 | Hird ........................ H04L 63/08 |
| 2016/0261408 A1* | 9/2016 | Peddada ............... H04L 9/0861 |
| 2017/0262639 A1* | 9/2017 | D'Souza ............... H04L 9/0825 |
| 2017/0272245 A1* | 9/2017 | Norton .................. H04L 9/0863 |
| 2018/0004930 A1* | 1/2018 | Csinger ............... H04L 63/0853 |
| 2018/0034630 A1* | 2/2018 | Rietman ............... H04L 9/3093 |
| 2020/0044843 A1* | 2/2020 | Mohammad ........ H04L 63/0435 |
| 2021/0111875 A1* | 4/2021 | Le Saint ................ H04L 9/085 |

OTHER PUBLICATIONS

"International Application Serial No. PCT US2019 016593, Written Opinion dated Apr. 29, 2019", 5 pgs.

"International Application Serial No. PCT US2019 016593, International Preliminary Report on Patentability dated Sep. 24, 2020", 7 pgs.

"European Application Serial No. 19766741.3, Extended European Search Report dated Mar. 25, 2021", 7 pgs.

* cited by examiner

PASSWORDLESS SECURITY SYSTEM FOR DATA-AT-REST

CROSS-REFERENCE TO RELATED APPLICATION

This application claims the benefit of U.S. provisional patent application No. 62/643,539 filed on Mar. 15, 2018, and titled "Passwordless Encryption of Data-At-Rest," which is incorporated by reference herein in its entirety.

TECHNICAL FIELD

The disclosed teachings generally relate to data encryption and/or decryption. The disclosed teachings more particularly relate to passwordless encryption and/or decryption techniques to secure data-at-rest.

BACKGROUND

The term "data-at-rest" is typically used as a complement to the terms "data-in-use" and "data-in-transit," which collectively define three stages of digital data. Data-at-rest typically refers to inactive data that is stored physically in a digital form (e.g., databases, data warehouses, spreadsheets, archives, tapes, off-site backups, mobile devices). For example, data-at-rest could refer to data that is stored in non-volatile storage (e.g., disk, tape) while data-in-use could refer to data actively being processed by a computer's processor or temporarily stored in volatile memory (e.g., random access memory). While it is generally accepted that archive data (i.e., which never changes) is data-at-rest regardless of its storage medium, and active data subject to frequent change is data-in-use, "inactive" data could include data that may change infrequently. Accordingly, the imprecise nature of data-at-rest could encompass broader states of data.

The security of data-at-rest is of increasing concern to businesses, government agencies, and other institutions. Mobile devices (e.g., smartphones) are often subject to specific security protocols that protect data-at-rest from unauthorized access when lost or stolen. There is an increasing recognition that database management systems and file servers should also be considered at risk. In particular, the longer that data is left unused in storage, the more likely it might be retrieved by bad actors.

Encryption of data prevents visibility in the event of unauthorized access, is commonly used to protect data-in-use or data-in-transit, and/or to protect the storage medium that stores data-at-rest. For example, encryption can be implemented on a database that houses data and on the physical storage where the database is stored. Access to a data container could require a password and/or an encryption key that unlocks the container to decrypt all its contents. In some cases, certain sensitive files are encrypted with respective cryptographic keys that are stored separate from the data. Accordingly, securing data-at-rest typically involves a highly risky "all or nothing" approach or a prohibitively complex collection of keys stored and managed separate from the data.

SUMMARY

The disclosed embodiments include at least one passwordless method and at least one apparatus for securing data-at-rest. The method includes encrypting data with a cryptographic key. The encrypted data is stored on a non-transitory computer memory of a first device. The method includes generating key shards based on the cryptographic key, which can be reconstituted from the key shards. The method further includes distributing the key shards among devices such that the encrypted data is secured at the first device because the first device is incapable of decrypting the encrypted data due to an absence of the cryptographic key.

In some embodiments, distributing the key shards includes communicating a key shard over a computer network to a device remotely located from the first device. In some embodiments, distributing the key shards includes communicating a key shard over a short-range radio link to a device remotely located from the first device. In some embodiments, distributing the key shards includes establishing a wireless link and a wired link between the first device and the devices to communicate respective key shards. In some embodiments, distributing the key shards includes establishing a communication link between the first device and a device over any of BLUETOOTH, Wi-Fi, Ethernet, visual link, auditory link, or USB link. In some embodiments, distributing the key shards includes establishing a communication link between the first device and a device over a cellular link. In some embodiments, distributing key shards includes encrypting a key shard with a unique public key such that the encrypted key shard is distributed to a device that has a counterpart private key, which enables decryption of the encrypted key shard.

In some embodiments, the devices include consumer electronic devices (e.g., handheld mobile device). In some embodiments, the devices and the first device belong to a single user that is authorized to access the encrypted data. In some embodiments, the devices include a computing device that belongs to a user that is not authorized to access the encrypted data. In some embodiments, the first device and the devices comprise each of a server, a personal computer, and a smartphone. In some embodiments, the devices are intermittently communicatively coupled to the first device. In some embodiments, the non-transitory computer memory is a local memory of a smartphone or a tablet computer, and the encrypted data includes files stored on the local memory.

In some embodiments, the cryptographic key is a first cryptographic key and the non-transitory computer memory stores data files that are each encrypted with respective cryptographic keys including a first data file encrypted with the first cryptographic key.

In some embodiments, the first device has a public key for each of the devices that each have a counterpart private key, and distributing the key shards to the devices includes encrypting each key shard of each device with a respective public key such that the encrypted key shards are distributed to the devices, and each device can decrypt its encrypted shard when requested to do so and return the decrypted shard to a requester.

In some embodiments, the method further includes collecting at least some of the key shards from the devices, reconstituting the cryptographic key from the collected key shards, and decrypting the encrypted data stored on the non-transitory computer memory of the first device with the reconstituted cryptographic key.

In some embodiments, at least some (or all) of the key shards are required to reconstitute the cryptographic key. In some embodiments, each device is physically separate from each other, and the devices includes the first device. In some embodiments, at least some of the key shards are automatically collected in response to a request to access the encrypted data. In some embodiments, the key shards are generated by processing the cryptographic key as input to a threshold cryptography data-sharing scheme. In some embodiments, the cryptographic key is a key for use in a block cipher. In some embodiments, the key shards are respective portions of the cryptographic key that collectively constitute the cryptographic key.

In some embodiments, a plurality of the various devices may be used to sign their shards such that their respective signatures can provide proof that the shards originated from the appropriate devices In some embodiments, the encrypted data includes records of a database stored in the database. In some embodiments, the encrypted data includes emails stored in an email archive. In some embodiments, the encrypted data includes any of an image, document, spreadsheet, audio file, or video file.

In some embodiments, the method further includes deleting the cryptographic key and deleting any key shards at the first device such that any cryptographic key for decrypting the encrypted data is unavailable at the first device.

In some embodiments, the key shards are a first set of key shards, and the devices constitute a first combination of devices. The method further includes generating a second set of key shards from a first minimum threshold number of the first set of key shards, distributing the second set of key shards among a second combination of devices, and generating a third set of key shards from the second set of key shards such that the cryptographic key is capable of being reconstituted based on a second minimum threshold number of the third set of key shards of the second combination of devices.

In some embodiments, a master public key may be derived from a plurality of device public keys, and a unique data identifier may be used to derive a public key from this master public key. This mechanism, known as threshold identity based encryption can be used to encrypt each data object. In this embodiment, a plurality of devices can produce a combined private key used for decryption and derived from the data identifier. In this embodiment, increased network efficiency is obtained at the expense of some security guarantee.

In some embodiments, the second combination of devices includes at least some of the first combination of devices. In some embodiments, the first minimum threshold number equals the second minimum threshold number, and the cryptographic key is capable of being reconstituted based on the first minimum threshold number of the first set of key shards. In some embodiments, the second minimum threshold number is different than the first minimum threshold number. In some embodiments, a total number of the second set of key shards is different than a total number of the first set of key shards.

In some embodiments, the method further includes generating a fourth set of key shards from a third minimum threshold number of the third set of key shards, distributing the fourth set of key shards among a third combination of devices, and generating a fifth set of key shards from the fourth set of key shards such that the cryptographic key is capable of being reconstituted based on a fourth minimum threshold number of the fifth set of key shards of the third combination of devices, which can be repeated as infinitum.

In some embodiments, the devices that store the key shards constitute a first set of devices that stores a first set of key shards, and the method further includes changing a type and quantity of the first set of devices to a second set of devices that stores a second set of key shards generated based on the first set of key shards and from which the cryptographic key can be reconstituted.

The disclosed embodiments also include a computing device that has a processor, and memory. The memory includes data objects and instructions that, when executed by the processor, cause the computing device to encrypt data objects with a respective unique cryptographic key, generate key shards for each unique cryptographic key, and distribute the key shards among devices such that decryption of any of the data objects requires reconstituting a unique cryptographic key from a threshold number of the key shards distributed among the devices.

In some embodiments, the computing device includes a file system that has files corresponding to the data objects, and includes the instructions for encrypting the data objects. In some embodiments, the computing device includes an email archive system that has emails corresponding to the data objects, and includes the instructions for encrypting the data objects.

In some embodiments, encryption of any data object, generation of the key shards, and distribution of any key shard is controlled by the originating device. In some embodiments, each of the devices is pre-selected by a user that is authorized to access the encrypted data objects.

The disclosed embodiments include another method for decrypting encrypted data stored on a non-transitory computer memory. The method includes obtaining key shards from devices, reconstituting a cryptographic key from the key shards, and enabling decryption of encrypted data stored on a non-transitory computer memory of a computing device with the reconstituted cryptographic key. In some embodiments, the reconstituted cryptographic key is enabled for only a period sufficient to decrypt the encrypted data. In some embodiments, the method includes automatically deleting the reconstituted cryptographic key after completing decryption of the encrypted data.

This Summary is provided to introduce a selection of concepts in a simplified form that is further described below in the Detailed Description, This Summary is not intended to identify key features or essential features of the embodied subject matter, nor is it intended to be used to limit the scope of the embodied subject matter. Other aspects of the disclosed embodiments will be apparent from the accompanying Figures and Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
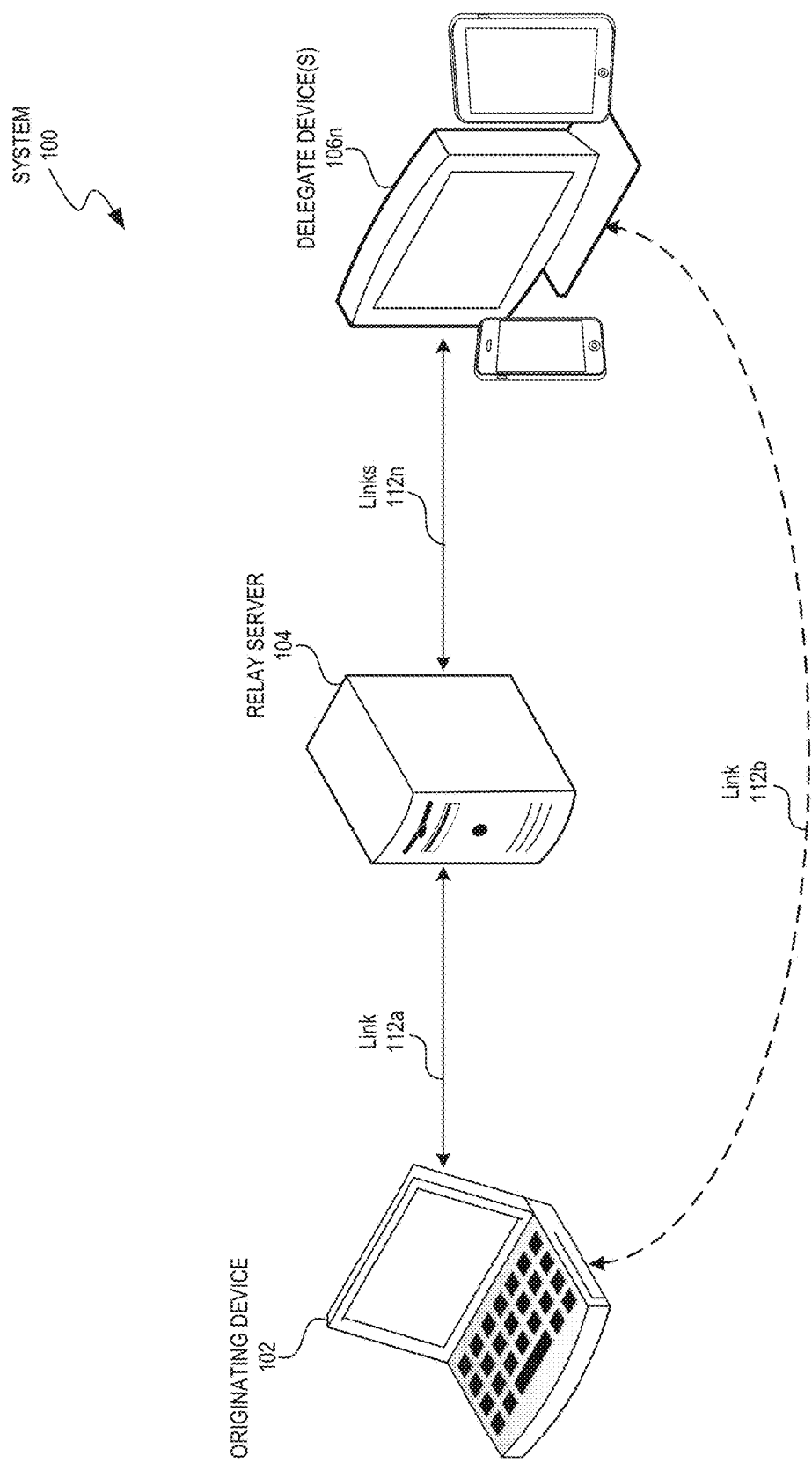
FIG. 1 is a block diagram that illustrates a system for implementing passwordless encryption of data-at-rest according to some embodiments of the present disclosure.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

Terms such as "processing," "computing," "calculating," "determining," "displaying," "generating" or the like, unless specifically stated otherwise, may refer to actions and processes of a computing device that manipulates and transforms data represented as physical (electronic) quantities within the computer's memory or registers into other data similarly represented as physical quantities within the computer's memory, registers, or other such storage medium, transmission, or display devices.

The terms "connected," "coupled," or variants thereof, as used herein, may refer to any connection or coupling, either direct or indirect, between two or more elements. The coupling or connection between the elements can be physical, logical, or a combination thereof.

The terms "channel" or "link" contemplate a means of communicating data or information, whether wired or wireless, and may utilize digital cellular transmission standards (e.g., CDMA, W-CDMA, LTE, HSPA+). Examples include Bluetooth, Wi-Fi, Ethernet, USB, USB-C, Thunderbolt, auditory link, or visual link (e.g., QR code and camera). A message may be communicated directly between two devices or indirectly through another device (e.g., a relay device) on one or more channels/links.

The term "target data," as used herein, may refer to data targeted for encryption. Examples of target data may include photos, documents, spreadsheets, audio files, video files, or any type of encryptable data files. Other examples include data stored in database tables, passwords, emails stored on a computer, or any data object.

The disclosed embodiments include techniques for securing data stored on a memory of a computing device. In some embodiments, a method includes encrypting data stored on a memory of a computing device with a block cipher using cryptographic key(s). Several key shards can be generated based on any of the cryptographic key(s) via a threshold cryptography data-sharing scheme. In some embodiments, each key shard of a cryptographic key can be encrypted with its own unique public key. An encrypted shard can be distributed to one of an array of physically distinct computing devices, which can each have a private key for its encrypted key shard. The cryptographic key can be reconstituted with a threshold number of computing devices that utilize their private keys to decrypt their respective key shards. Specifically, the threshold number of decrypted key shards can be used to reconstitute the cryptographic key, which can then be used to decrypt the encrypted data.

In conventional systems, a significant portion of data-at-rest that is stored at a computing device is not encrypted by default because of the challenges associated with password and cryptographic key management. Maintaining a sufficient quantity of unique keys and passwords to adequately secure all target data is challenging in any system, from consumer-grade to enterprise level. Home and enterprise users need access to hundreds or even thousands of individual data objects on a regular basis, and are unable to memorize or adequately keep track of many high-entropy passwords that would be required to secure target data. Accordingly, users are reluctant to embrace additional passwords for data encryption because they are already inundated with passwords for different sites, services, and apps.

A solution to securing large volumes of data-at-rest includes using a single master password as a key to decrypt numerous data objects stored in a container (e.g., a folder) stored in memory. This type of data security system is vulnerable to attack and, if compromised, will expose the numerous data objects with the single master password. For example, password manager tools such as DASHLANE and LASTPASS utilize a single password which, if compromised, would provide an attacker with access to all the data encrypted with that single password. The risk grows exponentially due to increased efforts in computer hacking and the proliferation of viruses, malware, and ransomware developed by bad actors to exploit vulnerabilities of existing key and password management tools.

Securing data-at-rest is complicated by the risk of losing keys or passwords. Unfortunately, users have grown accustomed to password retrieval mechanisms of websites such that they expect the ability to reset lost passwords that secure their data-at-rest. For example, when a user loses a password to access data of an enterprise system, the user expects that a network administrator can readily send a reset link or code to facilitate resetting the lost password, However, password resets are not possible in the context of encryption of data-at-rest because a decryption algorithm cannot be performed without access to the key or password. A solution to this problem includes so-called "back doors," which have been utilized to provide emergency access to data when a key or password is lost. However, the back doors create vulnerabilities that can be exploited by bad actors. Due to these limitations, most individual users and enterprises do not encrypt the vast majority of their data-at-rest.

Another solution is full-disk encryption, which has been utilized to provide security for physical loss or theft of hard drives. However, full-disk encryption does not protect against computer viruses, malware, ransomware or hackers who are able to gain control of a system. In an enterprise, if data-at-rest is encrypted, central management of encryption keys is often utilized to enable recovery of data when passwords are misplaced, lost, or forgotten. However, a centralized system creates a vulnerability as a treasure-trove of keys for attackers. In addition, full-disk encryption does not protect user data (e.g., email) stored on third-party platforms such as remote cloud storage providers.

The disclosed embodiments overcome the drawbacks of conventional systems by enabling the ability to secure large volumes of data-at-rest with "passwordless" encryption. Hence, unlike conventional systems, the disclosed embodiments do not necessarily require a user to undertake the burdensome step of inputting a password to access any data-at-rest, In fact, each data object can be encrypted with a separate unique cryptographic key that users are not required to explicitly store, memorize, manage, and safeguard to later decrypt any of the encrypted data objects. Instead, the disclosed embodiments require limited and periodic involvement by a user to decrypt any number of data objects while securing each data object with a block cipher using a unique cryptographic key. A "cryptographic key" or "key," as used herein, may refer to a string of bits used by a cipher to transform plain text into cipher text or vice versa. The key remains private and ensures secure storage and communication until the decryption event.

As described in greater detail below, a number of key shards can be generated based on a cryptographic key of a block cipher used to encrypt a data object. In some embodiments, the key shards are derived from the cryptographic key via a threshold cryptography data-sharing scheme. The key shards may be, for example, portions of a cryptographic key that collectively form the cryptographic key such that assembling the key shards would reconstitute the cryptographic key. While embodiments are described herein generally in the context of data-at-rest, files, or data objects in general, those skilled in the art will appreciate that the various embodiments could include implementations for database entries, smartphone files (e.g., image files), emails contained in an inbox (e.g., email on a MS Exchange server or in a Gmail inbox), etc.

The disclosed embodiments can include combinations of hardware and/or software. For example, an embodiment includes a security service that can operate on data stored on a computer storage medium. In another example, an embodiment can include an application distinct from an operating system or file system to separately operate on the data stored in the file system. In yet another example, an embodiment is integrated into an existing file system to provide a simplified interface to users for readily storing an accessing encrypted data-at-rest.

FIG. 1 is a block diagram that illustrates a system for implementing passwordless encryption of data-at-rest according to some embodiments of the present disclosure. As shown, the system 100 includes components such as an originating device 102, a relay server 104, and an array of delegate devices 106n. The originating device 102 can communicate over link 112a with the relay server 104, which can communicate with the delegate devices 106n over links 112n. In some embodiments, the components of the system 100 communicate as part of a security service of the originating device 102. In some embodiments, the originating device 102 and the delegate devices 106n can bypass the relay server 104 to communicate over a link 112b such as, for example, a wireless radio link (e.g., BLUETOOTH) or some other direct or indirect means of communication.

An "originating device," as used herein, is a computing device from which data-at-rest can be accessed. The data-at-rest can be stored at a local memory of the originating device 102 or stored at a remotely located memory of another computing device. In some embodiments, an originating device is a device on which new content is created or preexisting content is modified. In some embodiments, an originating device may be operated as a general-purpose computer running special-purpose software or a special purpose hardware device.

Examples of an originating device include a computer, smart or dumb terminal, a point-of-sale (POS) device, network computer, set-top box, game player, mobile device, wireless device, wireless telephone, personal digital assistant, media (e.g., music and/or video) player, camera, information appliance, workstation, minicomputer, mainframe computer, or any other device that can store or access data-at-rest. Specific examples of an originating device include a desktop computer, laptop computer (e.g., APPLE MACBOOK, LENOVO 440), smartphone (e.g., APPLE IPHONE, SAMSUNG GALAXY, NOKIA LUMINA), tablet computer (e.g., APPLE IPAD, SAMSUNG NOTE, AMAZON FIRE, MICROSOFT SURFACE), or any other computing device that can store or access data-at-rest. Although a single originating device 102 in shown in system 100, the disclosed embodiments can include any number of originating devices.

The originating device 102 can access one or more memories that store data. The memories can include non-volatile memory for storing data-at-rest. For example, the originating device 102 may include or access memory that stores a file system or an email archive. The memories can include volatile memory that stores data-in-use. In some embodiments, the memories include a local storage device and/or cloud-based storage device that can separately or collectively store data objects. The storage devices may be removable or non-removable computer readable storage media such as magnetic hard disk drives, solid-state drives, network-attached storage, flash memory devices, optical drives, remote cloud storage, etc. Other types of storage media that can be used in exemplary operating environments include, but are not limited to, magnetic tape cassettes, flash memory cards, DVDs, digital video tape, solid-state random-access memory (RAM), solid state read-only memory (ROM), etc. The storage media are typically connected to a system bus through a removable or non-removable memory interface.

In some embodiments, a special-purpose software application may be installed on the originating device 102 to practice elements of the disclosed operations, and to facilitate communication with other components of the system 100 including the relay server 104 and the delegate devices 106n. In some embodiments, the originating device 102 may also serve as a delegate device. A distinction between the originating device 102 and the delegate devices 106n is there function in the process of encrypting or decrypting data-at-rest with one or more cryptographic keys. In particular, the originating device 102 can access the encrypted data-at-rest stored in a local or remote memory and the delegate devices 106n can provide respective key shards used to derive the cryptographic key for encrypting or decrypting the data-at-rest stored by the originating device 102. As such, the delegate devices 106n can secure encrypted data-at-rest and authorize decryption of the encrypted data-at-rest by messaging key shards to the originating device 102.

A "delegate device," as used herein, may refer to a computing device on which private keys may be stored and on which key shards of cryptographic keys may be stored. A "key shard," as used herein, may refer to a data item of a threshold number of data items from which a cryptographic key can be reconstituted (e.g., derived). The delegate devices 106n can include any combination of computing devices such as those described herein with respect to the originating device 102.

The delegate devices 106n may include any device that has been configured, via software or hardware, to communicate securely with the originating device 102 (e.g., through the relay server 104) or among the delegate devices 106n. In some embodiments, the delegate devices 106n are portable computing devices (e.g., smartphones, tablet devices, laptop devices) but can further include any device that is accessible to the user and capable of communicating with the originating device 102 or among the delegate devices 106n. Examples include a desktop computer, smart or dumb terminal, a POS device, network computer, set top box, game player, mobile device, wireless device, wireless telephone, personal digital assistant, media player (e.g., music player, video player), camera, information appliance, workstation, minicomputer, mainframe computer, or any other device with similar computing functionality.

The relay server 104 may securely deliver messages and notifications between the originating device 102 and the delegate devices 106n. For example, the relay server 104 may represent any number of server computers that can relay key shards between the originating device 102 and the delegate device 106n over the links 112a-n. The user interface may be used to facilitate management of the encrypted data-at-rest by distributing and collecting key shards among the delegate devices 106n. In some embodiments, the relay server 104 may collect and store the encrypted data provided by the originating device 102 and/or the delegate devices 106, and provide that data to any of the other devices. The relay server 104 may include a combination of hardware and software that is well known to persons skilled in the art and, as such, a description is omitted herein for the sake of brevity.

The links 112a-n may include any combination of private, public, wired, or wireless portions. Any data communicated over the links 112a-n may be encrypted or unencrypted at various locations or along different portions of the links 112a-n. Each component of the system 100 may include combinations of hardware and/or software to process the data, perform functions, communicate over the links 112a-n, and the like. For example, any component of the system 100 may include a processor, memory or storage, a network transceiver, a display, operating system, and application software (e.g., for providing a user interface), and the like. Other components, hardware, and/or software included in the system 100 that are well known to persons skilled in the art are not shown or discussed herein for the sake of brevity.

The ability to communicate over a wireless radio link 112b (e.g., BLUETOOTH, Wi-Fi) allows the originating device 102 to bypass the relay server 104, to encrypt and decrypt data-at-rest by retrieving key shard(s) directly from delegate device(s). Direct access by the originating device 102 to the delegate devices 106n is useful when any of the links 112a or 112n is down or inaccessible. Communication links, particularly those established between the delegate devices 106n and the originating device 102 may require modifications to the delegate devices or information presented on a mobile device such as a quick response (OR) code. In some embodiments, all communications, regardless of intermediary, are secured by encrypting data with the destination device's public key.

Therefore, the system 100 can implement passwordless encryption of data-at-rest by using a combination of symmetric cryptography, asymmetric cryptography, and threshold cryptography implemented by multiple computing devices. For example, advanced encryption standard (AES) or another cipher can be employed by the originating device 102. In some embodiments, the key shards are fragments of a cryptographic key that are the outputs of a configurable threshold secret-sharing scheme such as Shamir's secret sharing scheme, Blakley's scheme, or Chinese remainder theorem-based secret sharing. In some embodiments, the sharing scheme is operable to represent the cryptographic key with N fragments of which only M are required to reconstitute the original BC cryptographic key. Accordingly, the delegate devices 106n can provide a threshold number of key shards required to reconstruct a cryptographic key. Thus, the originating device 102 can decrypt data by accessing the threshold number of key shards rather than requiring input of the cryptographic key in its entirety.

Figure 2:
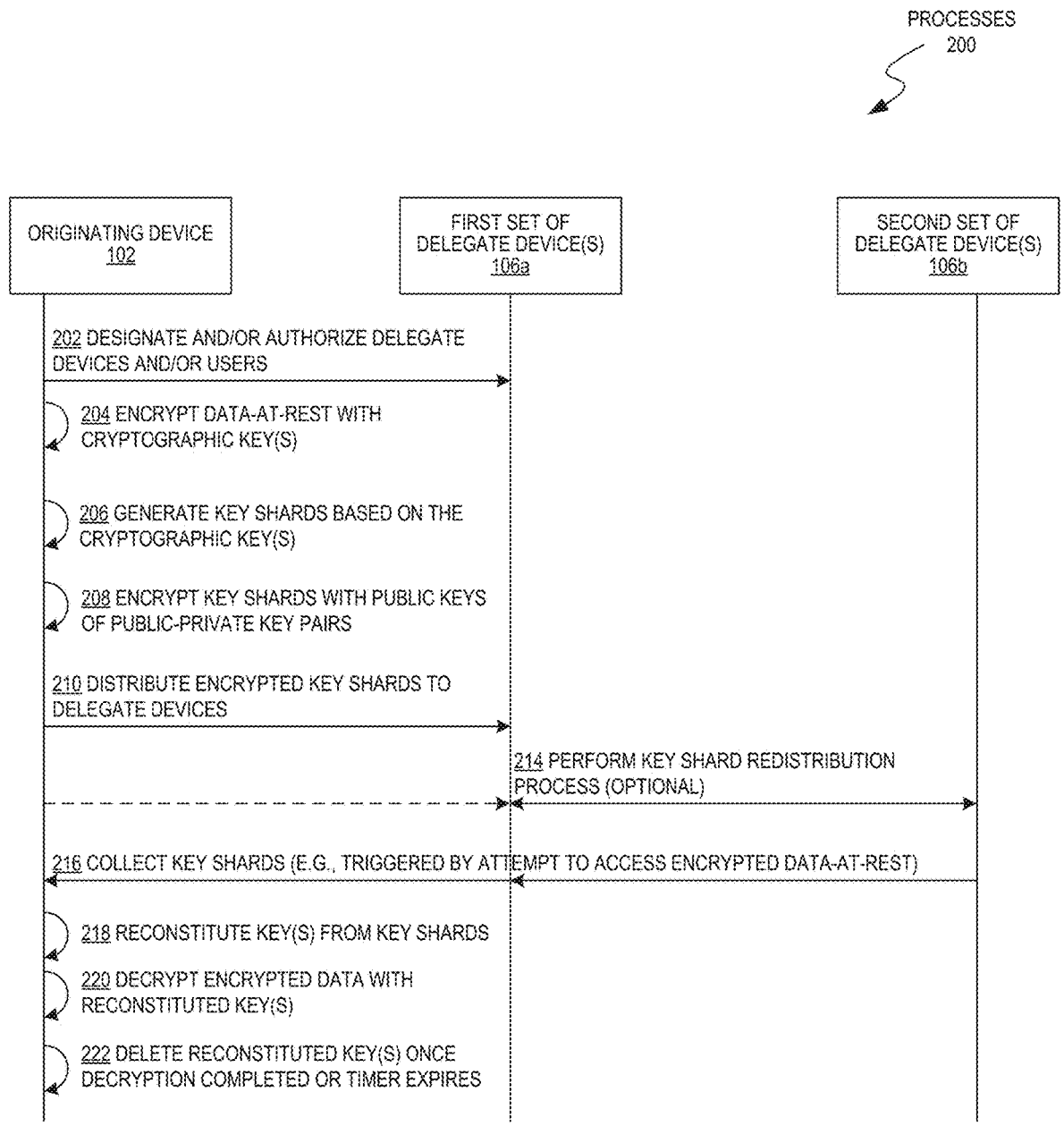
FIG. 2 is a flow diagram that illustrates various processes for passwordless security of data-at-rest according to some embodiments of the present disclosure.

FIG. 2 illustrates various processes of the disclosed passwordless techniques for securing data-at-rest. The disclosed techniques include the use of a combination of symmetric cryptography, asymmetric cryptography, and configurable threshold cryptography to manage encryption and/or decryption of data-at-rest. The processes 200 can be a performed by the originating device 102 and delegate devices 106a-b as part of a security service. The originating device 102 or delegate devices 106a-b can include a variety of different devices such as those discussed with reference to FIG. 1.

The originating device 102 and/or delegate devices 106a-b may belong to a user that is authorized to access and decrypt data objects with the originating device 102. In some instances, at least some of the delegate devices 106a-b may belong to users that are not authorized to access the encrypted data. The memory storing the encrypted data may be a local memory of the originating device 102 and/or a remote memory, and the encrypted data is stored on the local or remote memory.

In step 202, a user of the originating device 102 can designate a set of computing devices as delegate devices 106a or authorize a user of the delegate devices 106a. In some of the embodiments, each of the delegate devices 106a is physically separate from each other and/or could include the originating device 102.

In step 204, the originating device 102 encrypts target data with a cryptographic key. The cryptographic key may be created specifically to encrypt the target data. For example, the cryptographic key may be a string of bits of a symmetric key for use in a block cipher capable of transforming plain text into cipher text and vice versa. In some embodiments, the cryptographic key is generated temporarily to encrypt data-at-rest and is thereafter deleted.

The target data may include various types of data objects (e.g., image, document, spreadsheet, audio file, video file) that are each encrypted with respective cryptographic keys. Examples include a file system with various files and instructions for encrypting the files, an email archive system with emails and instructions for encrypting the emails, a database system records and instructions for encrypting the messages, etc. The encrypted target data is stored on a non-transitory computer memory that can be accessed by the originating device 102.

In step 206, the originating device 102 generates N key shards based on the cryptographic key. The cryptographic key can be derived (reconstituted) from a necessary and sufficient threshold number M of the N key shards. For example, the set of N key shards can be generated via a threshold cryptography data-sharing scheme. When the user wants to decrypt the encrypted target data, M-of-N key shards are processed to reconstitute the cryptographic key. The set of key shards can be stored locally and/or distributed among the delegate devices 106a-b. As used herein, a "key shard" of a cryptographic key may also be referred to as a component, fragment, or by any other term that indicates a part or element of a set of key shards.

To aid in understanding data-sharing schemes, consider an W order polynomial that could be reconstituted from W+1 points of that polynomial. For example, consider a second order polynomial aX^2+bX+c where the cryptographic key is represented by the constant term c. The polynomial can be reconstituted with any three points of the polynomial. Examples of a sharing scheme include Shamir's Secret Sharing Scheme, Blakley's scheme, secret sharing using the Chinese remainder theorem, or any other sharing scheme understood by persons skilled in the art. In one simple example, a cryptographic key such as the password "secret" can be used to encrypt target data, split into the shards "sec" and "ret," and reassembled later to decrypt the encrypted target data.

Figure 3:
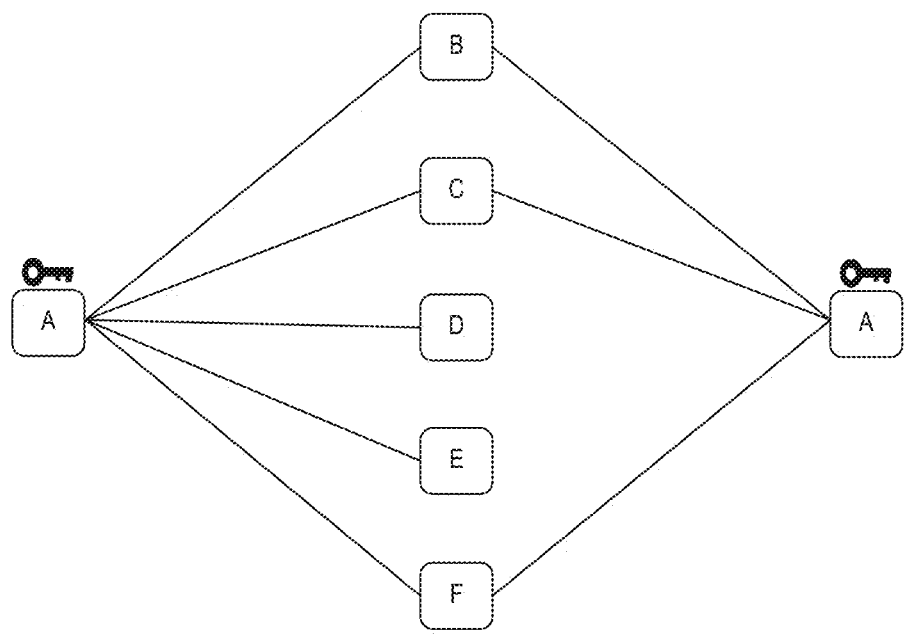
FIG. 3 is a block diagram of an example process for generating key shards, based on a cryptographic key, of which a threshold number can be used to reconstitute a cryptographic key according to some embodiments of the present disclosure.

For example, FIG. 3 is a block diagram of an example process for generating a set of key shards, based on a cryptographic key, of which a threshold number of the key shards can be used to reconstitute a cryptographic key. As shown, device A is an originating device and devices B through F are delegate devices. A set of key shards can be distributed across combinations of the computing devices A, B, C, D, E, and/or F. The illustrated example is of a three-of-five configuration where only three key shards are required to reconstitute the cryptographic key and remaining devices are superfluous. Thus, losing access to any two-of-five computing devices B through F would not prevent the originating device 102 from reconstituting the cryptographic key because the key shards from the remaining computing devices are sufficient to do so. Note, however, that the cryptographic key cannot be reconstituted from a subset of the key shards that is less than the threshold number (e.g., two key shards). The reconstituted cryptographic key can then be used to decrypt or encrypt data.

The disclosed embodiments include an asymmetric key pair that is generated for each delegate device 106a, The key pair includes a delegate public key and a delegate private key. These two keys may be created together using a key generation technique such as RSA or elliptic curve key pairs. The delegate asymmetric key pair may be generated at a delegate device. The delegate private key may be kept exclusively on the delegate device and never shared or exported to another computing device. In contrast, the delegate public key is shared or exported for use by another delegate device or the originating device. In some embodiments, the key shards can be encrypted with the delegate public keys to produce encrypted key shards that can be securely communicated to their delegate devices. The mechanism for encryption and the choice of key strength may be configurable and may include, for example, RSA, ECIES, ElGamal and other encryption schemes with similar functionality Each delegate device may generate a delegate key pair including a delegate private key and delegate public key. Each delegate device can retain its respective delegate private key. For example, delegate device D1 could retain private key K-1, delegate device D2 could retain private key K-2, and so on. Each of the N delegate devices may also distribute its delegate public key to any other delegate device and each originating device such that all delegate devices and originating devices have all the delegate public keys and originating device public keys.

A backup key pair may be generated with a backup public key distributed to the various originating devices as well, The decision whether to generate a backup public key may depend on user or administrator preference. Hence, the disclosed embodiments may employ other key pairs that improve security. For example, an embodiment may employ a backup asymmetric key pair, which includes a backup public key and a backup private key. These backup key pairs may be generated by a computing device when offline by using a key generation technique such as RSA or elliptic curve key generation. The backup private key can be kept on the offline computer while the backup public key can be exported for use by other computing devices.

In step 208, each of the N key shard is encrypted with one of N public keys associated with a respective delegate device to create N encrypted key shards. In addition, any metadata associated with the original data is authenticated, for example via MAC or by including the metadata in the shard. The originating device 102 may have access to all the public keys of the delegate devices 106a such that the originating device 102 can use the public keys to encrypt the key shards for respective delegate devices 106a. The delegate devices 106a hold respective counterpart private keys that can be uses to decrypt their respective key shards as needed.

In some embodiments, the cryptographic key is optionally encrypted using a backup public key to create an encrypted cryptographic key that can be decrypted using a backup private key. The backup keys are generally created and stored in an offline environment. For example, a file system (FS) can encrypt the target data by using the cryptographic key. The FS can store the encrypted key shards with the encrypted target data in an archive file on disk. In addition, if a backup public key was created, it may be used to encrypt the cryptographic key, which may then be added to the archive file.

Figure 4:
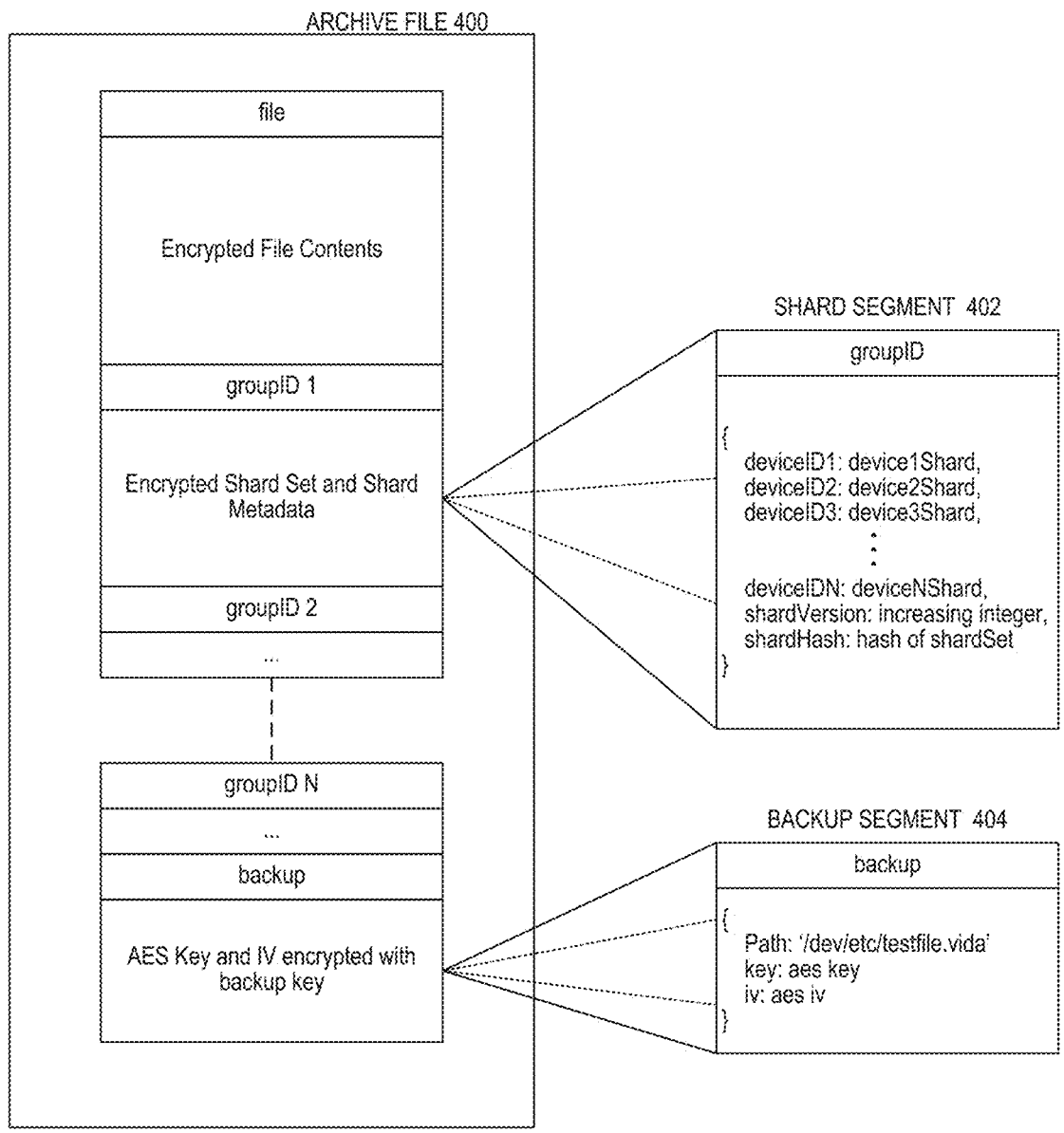
FIG. 4 is a block diagram illustrating an archive file according to some embodiments of the present disclosure.

An "archive file," as used herein, is a customized file format in which target data that has been encrypted with, for example, a BC using a cryptographic key may be stored together with any combination of encrypted versions of the cryptographic key (or related keys), encrypted key shards, or encrypted key sub-key shards. For example, FIG. 4 is a block diagram that depicts an archive file 400 according to some embodiments of the present disclosure. The archive file 400 has a file structure including a shard segment 402, and backup segment 404.

As shown, the archive file 400 may include an entire cryptographic key that has been encrypted with a backup public key or another asymmetric encryption technique. Hence, decryption of an archive file may require additional cryptographic information to produce a decrypted version of the cryptographic key. In some instances, additional sets of encrypted key shards are added in the archive file. The additional sets of encrypted key shards may be used to open files. With the encrypted key shards added to the archive file, the encryption process is complete, In some embodiments, at least some of the encrypted key shards are optionally sent to the delegate devices 106a to further improve security. Optionally distributing the N encrypted key shards to the delegate devices 106a reduces the network traffic required to decrypt data and redistribute shards. Encrypted target data is recoverable with the key shards stored at the delegate devices 106a.

For example, in step 210 of FIG. 2, the N encrypted key shards are distributed among the first set of delegate devices 106a such that the originating device 102 is incapable of decrypting the encrypted target data due to an absence of a cryptographic key and the keys shards from which the cryptographic key can be reconstituted. For example, the originating device can communicate with a relay server to distribute the shards among the delegate devices 106a.

In some embodiments, distributing the N encrypted key shards involves establishing a wireless link (e.g., Wi-Fi, BLUETOOTH, cellular), a wired link (e.g., Ethernet, USB), visual link, or auditory link between the originating device 102 and the delegate devices 106a, For example, at least one of the N key shards can be communicated over a computer network to at least one of the set of delegate devices 106a that are remotely located from the originating device 102. In another example, at least one of the N key shards is communicated over a short-range radio link to at least one of the set of delegate devices 106a that is located remote from the originating device 102. The delegate devices 106a may be temporarily or intermittently coupled to the originating device 102 to communicate the key shards.

In some embodiments, a local security service can extract a set of encrypted key shards from an archive file. The originating device 102 may pass the set of encrypted key shards to a communication service, which distributes the encrypted shards to respective delegate devices. Communication among the delegate devices 106a may be direct (e.g., on the same LAN, via BLUETOOTH or Ethernet connection) or via a relay server or onion routing scheme.

Key Shard Redistribution Process

The disclosed embodiments include a key shard redistribution process to replace or add a delegate device to an existing set of delegate devices. If an existing delegate device is lost, stolen, destroyed, rendered obsolete, or is otherwise inaccessible, it can be replaced with another delegate device according to the redistribution process. In some embodiments, the threshold number of key shards required to reconstitute a cryptographic key may be the same or different from the threshold number of key shards required for the redistribution process. Moreover, the redistribution process can be used to change the threshold number of devices required to reconstitute a cryptographic key.

In step 214, the optional redistribution process is performed to generate a second set of key shards based on a combination of the first set of key shards. The second set of key shards is generated from a first threshold number of the first set of key shards, and may include some or none of the first set of key shards. The number of the second set of key shards may be the same or different than the first set of key shards. The cryptographic key is capable of being reconstituted from either the first set of key shards or the second set of key shards. Further, the second set of key shards may be generated without ever reconstituting the cryptographic key.

In some embodiments, the redistribution process involves generating intermediary sub-key shards from the first set of key shards, and then generating the second set of key shards from the sub-key shards. The sub-key shards are distributed among the second combination of devices that can generate the second set of key shards based on the sub-key shards. As such, a type and number of the first set of delegate devices that holds the first set of key shards can change to a second set of delegate devices that holds the second set of key shards. Hence, the second combination of delegate devices may include some or none of the first combination of delegate devices.

Figure 5:
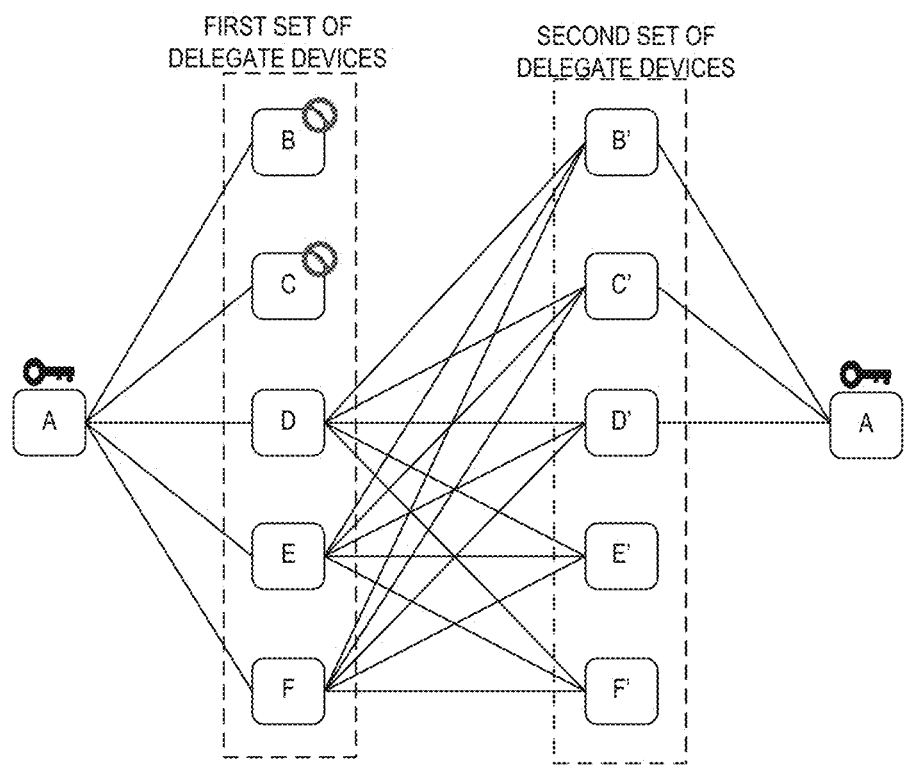
FIG. 5 is a block diagram of an example key shard redistribution process according to some embodiments of the present disclosure.

FIG. 5 is a block diagram that illustrates an example process for generating new key shards from a threshold number of existing key shards such that a cryptographic key can be reconstituted from a new threshold number of the new key shards according to some embodiments of the present disclosure. In the illustrated example, a three-of-five configuration is required to perform the redistribution process and to reconstitute the cryptographic key. That is, only three key shards are required to replace any number of the first set of delegate devices and only three new key shards are required to reconstitute the cryptographic key.

The redistribution process requires decrypting only a threshold number of encrypted key shards. The threshold number of unencrypted key shards may be made available from the archive file or from the respective delegate devices on which they reside, The threshold number of unencrypted shards are inputs to a redistribution process that produces a new set of unencrypted key shards, which can be encrypted with the private keys of the second set of delegate devices (including any new delegate devices), resulting in more encrypted key shards compared to the original number of key shards. The new encrypted key shards can be added to the archive file of the originating device and may be distributed to additional delegate devices.

As shown, the originating device A generates five key shards based on a cryptographic key, and distributes the five key shards to the first set of delegate devices B through F. The device B is a primary delegate device (e.g., user's smartphone), and the delegate devices C through F are backup delegate devices (e.g., each a tablet computer). Assume that devices B and/or C are lost or otherwise inaccessible. A user can operate a GUI on the originating device A (or a remaining delegate device) to trigger a redistribution process to the new delegate devices B' through F'.

A set of sub-key shards are created as an intermediate step in the process to create the new set of key shards for the second set of delegate devices B' through F'. As used herein, "sub-key shards" may refer to key shards generated based on other key shards and which have been created in accordance with a redistribution process that extends the sharing scheme to create a new set of key shards from a preexisting subset of a threshold number of key shards. Of the new set of key shards, only another threshold number may be required to reconstitute the original cryptographic key. Therefore, the new threshold and new number of key shards need not be the same as the original threshold and original number of key shards, respectively.

As shown, the originating device A works in consort with the delegate devices D, E, and F to produce sub-key shards for the delegate devices B' through F'. The delegate device D will produce sub-key shards D-1 through D-5, the delegate device E will produce sub-key shards E-1 through E-5, and the delegate device F will produce sub-key shards F-1 through F-5. The sub-key shards D-1, E-1, and F-1 are for the new delegate device B'. The sub-key shards D-2, E-2, and F-2 are for the new delegate device C'. The sub-key shards D-3, E-3, and F-3 are for the new delegate device D'. The sub-key shards D-4, E-4, and F-4 are for the new delegate device E', and the sub-key shards D-5, E-5, and F-5 are for the new delegate device F'. The new key shards are derived from the sub-key shards at the respective new delegate devices B' through F'.

Therefore, the new set of delegate devices B' through F' replace the old set of delegate devices B through F. The new key shards may be encrypted with the respective public key of the delegate devices B' through F'. The new encrypted key shards can be added to the archive file of the originating device A, and may be distributed to other remaining delegate devices. Except for the missing shards, the remaining encrypted key shards may be made available at the archive files or at respective delegate devices on which they reside. There is no need to reconstitute the cryptographic key during the redistribution process, nor are three-of-five decrypted shards required at any device during the redistribution process. Instead, the cryptographic key only needs to be reconstituted to decrypt or encrypt target data. Further, a minimum threshold number of delegate devices and respective key shards are needed to reconstitute the cryptographic key. In this instance, three-of-five new key shards are required to reconstitute the cryptographic key.

The ability to limit the need to reconstitute the cryptographic key only to decrypt or encrypt target data improves the security of the target data. For example, needing to reconstitute cryptographic keys for numerous data objects to create new sets of key shards is undesirable because this would create a vulnerability. In particular, a bad actor that knows that a redistribution process will occur because the bad actor stole a delegate device could snoop to capture cryptographic keys for data object during that process. Hence, the embodiments mitigate the risk of this vulnerability by avoiding the need to reconstitute any cryptographic key except to encrypt or decrypt data objects.

Although FIG. 5 illustrates a process for replacing an entire first set of delegate devices with the second set, the redistribution process can be utilized to replace any number of delegate devices, as long as the threshold number of the original delegate devices are available for the redistribution of key shards. Moreover, the redistribution process can be used to add an infinite number of different combinations of delegate devices. For example, consider a situation where the first set of delegate devices only includes D, E, and F. After performing a redistribution process, the second set of delegate devices may include B', C', D, E, and F.

Therefore, the disclosed embodiments include techniques for incorporating other computing devices into a set that stores key shards. This includes adding or replacing selected computing devices to create a new combination of computing devices that store the set of key shards required to reconstitute a cryptographic key from the threshold number of key shards, and then re-sharding the cryptographic key to generate a new set of key shards for a new combination of computing devices.

Decryption Process

In step 216, the decryption process may be invoked when a user of the originating device 102 attempts to open a file, read data from a database, or otherwise access an encrypted data object. For example, a file opening process may be interrupted by a file system (FS) handler or operating system handler, which recognizes the file that contains the encrypted data object. In some embodiments, the originating device 102 collects at least the threshold number of decrypted key shards from the delegate devices 106a and/or 106b. For example, the originating device 102 can cause the delegate device 106a-b to communicate their respective key shards to the originating device 102.

In some embodiments, the delegate devices 106a-b can check with users in possession of respective delegate devices as to whether to permit the decryption event. The request for permission may be presented in a variety of forms such as a text or SMS message, a popup notification, LED display, or other format built-in to the operating system or provided by system software and available hardware. The user may accept the request for a decryption event. In some embodiments, a request is automatically denied after a predetermined period expires.

In an M-of-N configuration, only a threshold M of the total N key shards are required to reconstitute a cryptographic key. Of the N corresponding delegate devices, one or more are primary (i.e., authorizing) devices and the remainder are secondary devices. For example, in a 2-of-3 configuration in which there is a laptop, a smartphone, and a tablet, the laptop could be the originating device, the smartphone could be the primary delegate device, and the tablet could be a delegate secondary device. In this example, reassembly of the cryptographic key requires participation by only two devices: the originating device and the smartphone. Participation by a secondary device is not necessary unless the primary delegate device is unavailable.

In some embodiments, a user in possession of a delegate device may, contingent on the name, type, path or other target data metadata, set a threshold for a number of automatic affirmative responses to requests for decryption. For example, the threshold may be set to automatically decrypt the next 10 shards received or automatically decrypt all shards received during the next 12 hours. If decryption is permitted, the delegate device can decrypt its respective encrypted key shard and return the decrypted key shard to the originating device 102 via a relay server or other communication channel, or can be re-encrypted for transit to the originating device 102. The key shards received by the originating device can be used to reconstitute the cryptographic key, which is delivered to the FS or operating system. The target data may then be decrypted and opened.

In step 218, the originating device 102 reconstitutes a cryptographic key from key shards collected from the originating device 102 and/or the delegate devices 106a-b. In some embodiments, at least some or all of the key shards are required to reconstitute the cryptographic key. Specifically, the cryptographic key is reconstituted from a threshold number of the key shards collected from the originating device 102 and/or the delegate devices 106a-b. Then, in step 220, the originating device decrypts the encrypted target data stored on a non-transitory computer memory with the reconstituted cryptographic key.

In some embodiments, any reconstituted cryptographic keys are enabled for only a period sufficient to decrypt the encrypted data. For example, in step 222, any reconstituted cryptographic keys are automatically deleted after completing decryption of the encrypted target data. In some embodiments, a cryptographic key and any copies of key shards are made inoperable or deleted from the originating device 102 such that any cryptographic key for decrypting the encrypted data is unavailable or underivable except during decryption or encryption of target data.

The disclosed embodiments also include a process for modifying encrypted data. The data that has been encrypted according to the encryption process described herein can be decrypted according to the decryption process described herein. The decrypted data can then be modified, and again encrypted according to the encryption process described herein.

The disclosed embodiments also include a key rotation process. For example, a user or a system may wish to rotate or change the cryptographic keys used for encrypting target data. Key rotation can be accomplished by decrypting the target data by using a first cryptographic key in the decryption process described herein and then re-encrypting the target data by using the encryption process described herein, but with a second cryptographic key that is different from the first cryptographic key.

The originating device may be operating under the control of an operating system that provides a file system, which controls how data is stored and retrieved. In some embodiments, the originating device may be configured to run a virtual file system (VFS), an interface layer or abstraction layer that insulates the application program from the file system implementation, and can provide a common interface to multiple types of file systems. If a VFS is utilized, the VFS can respond to application-level calls for file operations including opening, reading, writing, and appending to files stored on the device, The VFS can also respond to handling encryption events applicable for each file operation. If the originating device is not running a VFS, the originating device's operating system may respond directly to application-level calls for file operations and handling encryption events applicable for each file operation.

Figure 6:
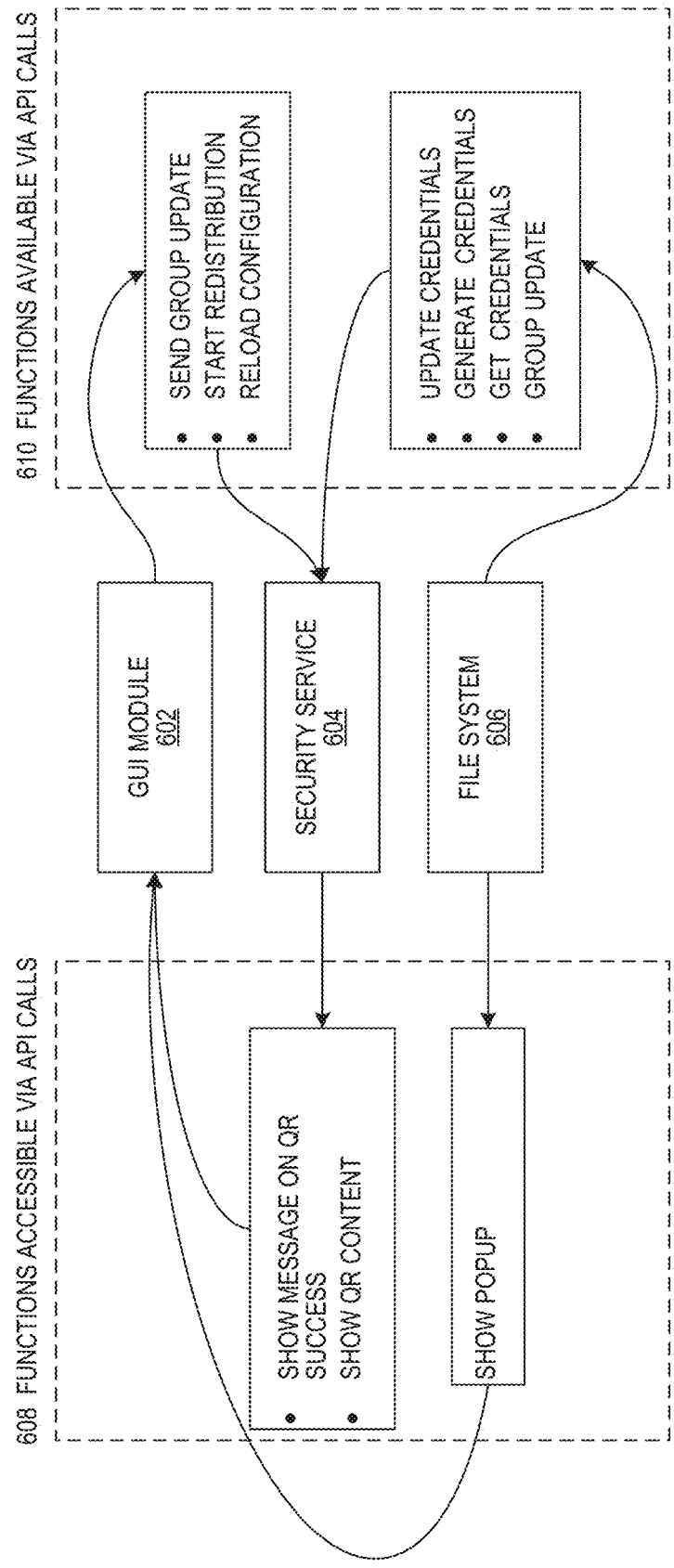
FIG. 6 is a block diagram that illustrates components of an originating device operable to secure data-at-rest according to some embodiments of the present disclosure.

For example, FIG. 6 is a block diagram that illustrates components of an originating device operable to perform at least some of the processes 200. For example, the originating device may include a graphical user interface (GUI) module 602 that facilitates interactions with a user. The originating device may also include a security service 604, a file system 606, and various functions accessible or available via API calls 608 and 610. Tasks such as adding or removing a delegate device, system configuration, controlling alerts, and other features may be managed by a user through the GUI module 602.

In some embodiments, the originating device's security service 604 is a program that runs at an originating device, though it could be running elsewhere such as on a dedicated server. For example, the security service can accept requests from a file system (e.g., virtual file system (VFS), a file system built into the computer's operating system, a customized file system or otherwise) to reconstitute a cryptographic key used to decrypt content of an archive file. In some embodiments, the security service is part of a special-purpose software application installed on the originating device to enable the disclosed cryptographic operations and facilitate communications with a relay server and/or delegate device.

Figure 7:
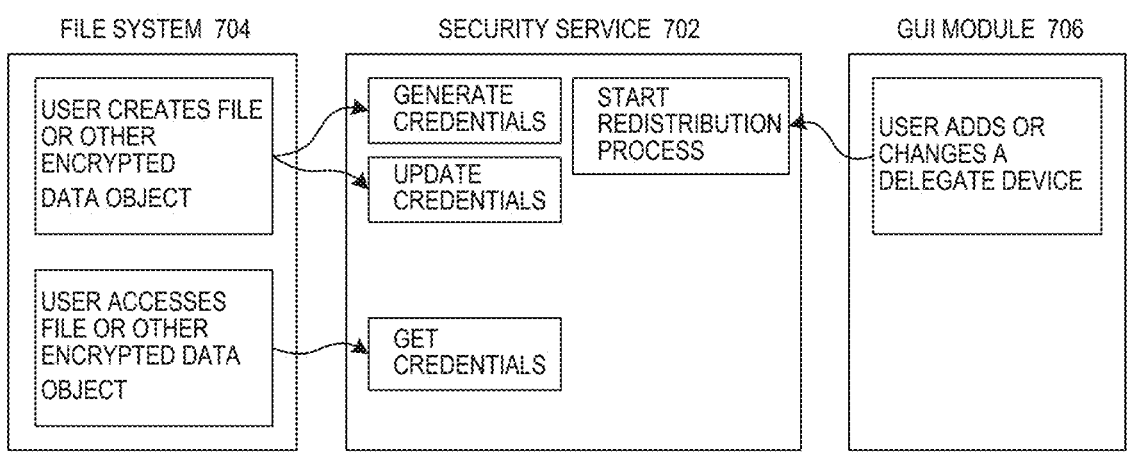
FIG. 7 is a block diagram illustrating a data flow among components of an originating device according to some embodiments of the present disclosure.

FIG. 7 is a block diagram illustrating a data flow among components of an originating device according to some embodiments of the present disclosure. The security service 702 may control communication via a relay network, key storage, and key management. The security service 702 is communicatively coupled to the file system 704 (e.g., VFS) and the GUI module 706. As an example, the security service 702 may communicate messages and notifications across a relay network related to generating, updating, and sharing credentials.

In some embodiments, a cryptographic process starts with a user or a program attempting to open a file located in a file system 704. The file system 704 could appear as a folder within a user's home directory. From the user's perspective, the file system 104 could operate like other folders on the originating device. On the back end, the files within the file system 704 folder are data stored in an encrypted manner within archive files. The user need not be aware of the archive files nor their actual location, which could be in cloud storage, on a file server, or both on the local device with the data mirrored on a cloud server (e.g., DROPBOX, GOGGLE DRIVE).

The file system 704 (as a virtual file system) may manage interactions with the file system of the originating device's storage device. An application programming interface (API) may be provided to permit communications among the modules in the originating device. For example, the file system 704 can communicate with the security service 702 that the file system 704 needs a key to decrypt data in an archive file. The security service 702 then contacts the various delegate devices, retrieves relevant key shards, reconstitutes the cryptographic key, and delivers the reconstituted cryptographic key to the file system 704. The file system 704 can then decrypt the data in the archive file. In some embodiments, the file system 704 will usually pass the relevant encrypted key shards found within the archive file to the security service 702. The security service 702 can then send those encrypted key shards to a relay server for eventual receipt by relevant delegate devices. The relevant delegate devices, using their respective private keys, can decrypt the encrypted key shards, and return unencrypted key shards to the security service 702, which can reconstitute the cryptographic key and return it to the file system 704. The file system 704 can use the reconstituted cryptographic key to decrypt the data stored in the archive file and then present the decrypted data to the relevant program.

In some embodiments, the archive file may not contain certain associated encrypted key shards. The missing key shards could be stored only on delegate devices. Under those circumstances, the security service 702 can instruct delegate devices to produce relevant key shards by using a reference number for the archive file.

The security service 702 may also be responsible for producing new cryptographic keys for the file system 704 (e.g., upon creation of a new file), using a sharing scheme to create key shards, and encrypting those key shards with public keys of respective delegate devices. The encrypted key shards can be sent to the delegate devices, and also sent back to the file system 704 for storage within the archive file.

The security service 702 can also interact with the GUI module 706 to handle with several operations including loss or removal of a delegate device, the replacement or addition of a delegate device, and change the number of either M or N key shards. These operations may require a redistribution of key shards in accordance with the key shard redistribution process described herein.

The security service 702 can interact with the GUI module 706 to process a change in the user's delegate devices for authorization or backup purposes. For example, an implementation may have a 2-of-4 configuration, meaning that at least two of four computing devices that store respective distributed key shards are required to assemble a cryptographic key that enables decryption of target data. The user's computing devices may include a laptop as an originating device, a smartphone as a primary delegate device, a tablet as a backup delegate device, and a friend's smartphone as another backup delegate device. All four devices store respective encrypted key shards and the associated private key required for decryption. Under normal circumstances, the user will only receive decryption requests on the user's primary delegate device, and the originating device will provide decrypted key shards by default. If the battery of the user's primary delegate device (e.g., smartphone) is discharged, the user may wish to switch the duty of the primary delegate device temporarily to the backup delegate device (e.g., tablet). Switching to the backup delegate device would not require a redistribution operation but could require communication via the relay server.

Setup Process

Figure 8:
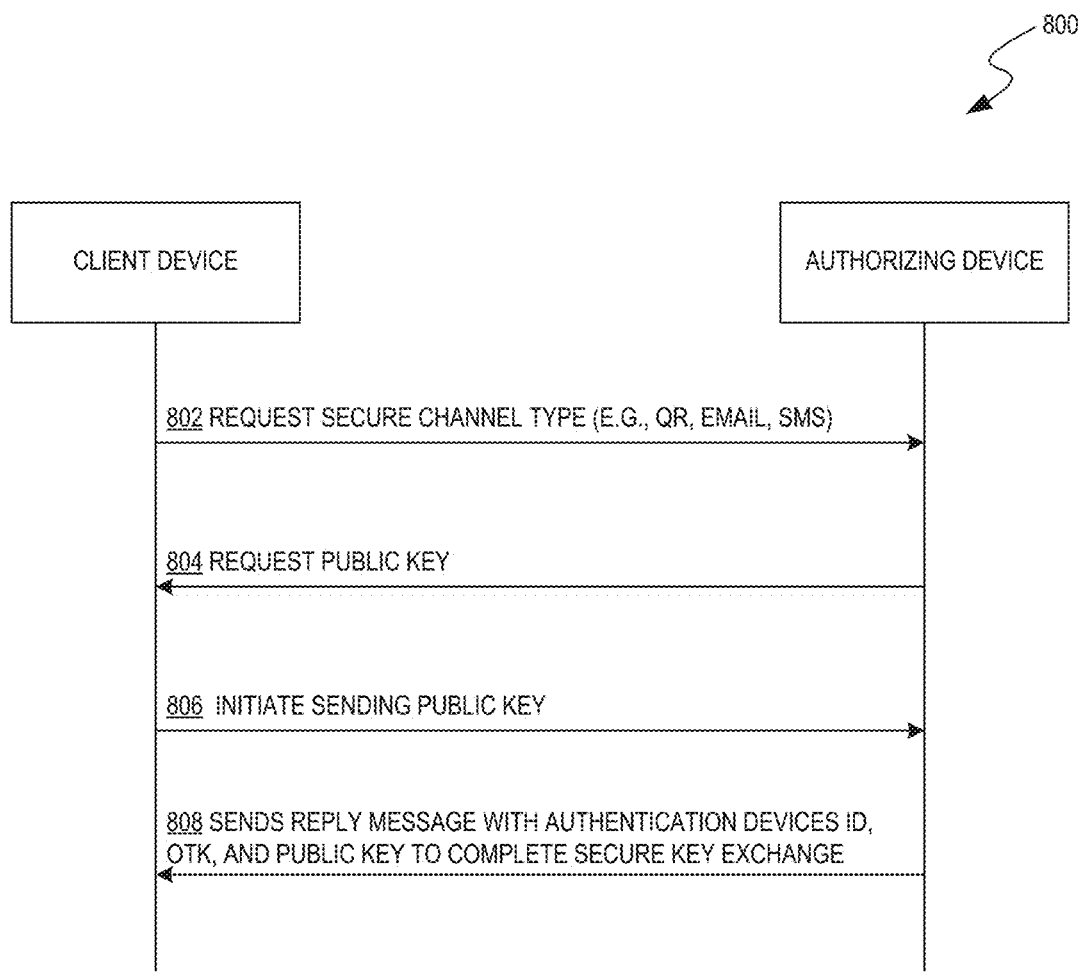
FIG. 8 is a flow diagram that illustrates a secure third-party channel (STPC) device linking according to some embodiments of the present disclosure.

The disclosed embodiments include processes for securely linking devices to exchange data such as key shards. For example, FIG. 8 is a flow diagram illustrating a secure third-party channel (STPC) device linking process 800 according to some embodiments of the present disclosure. More specifically, process 800 implements a secure communication channel for the exchange of public keys.

In step 802, a client device (a first device) can request a secure channel type (e.g., QR, email, SMS) by selecting a channel and then sending its device ID such as, for example, a random 16-byte one time key and a hash of its public key to the authorizing device (a second device). In step 804, the authorizing device requests the client device's public key. In step 806, the client device initiates sending the public key to the authorizing device. Lastly, in step 808, the authorizing device sends a reply message with an authentication device ID, one-time key (OTK), and public key to complete the secure exchange required to establish a secure link between the devices.

Figure 9:
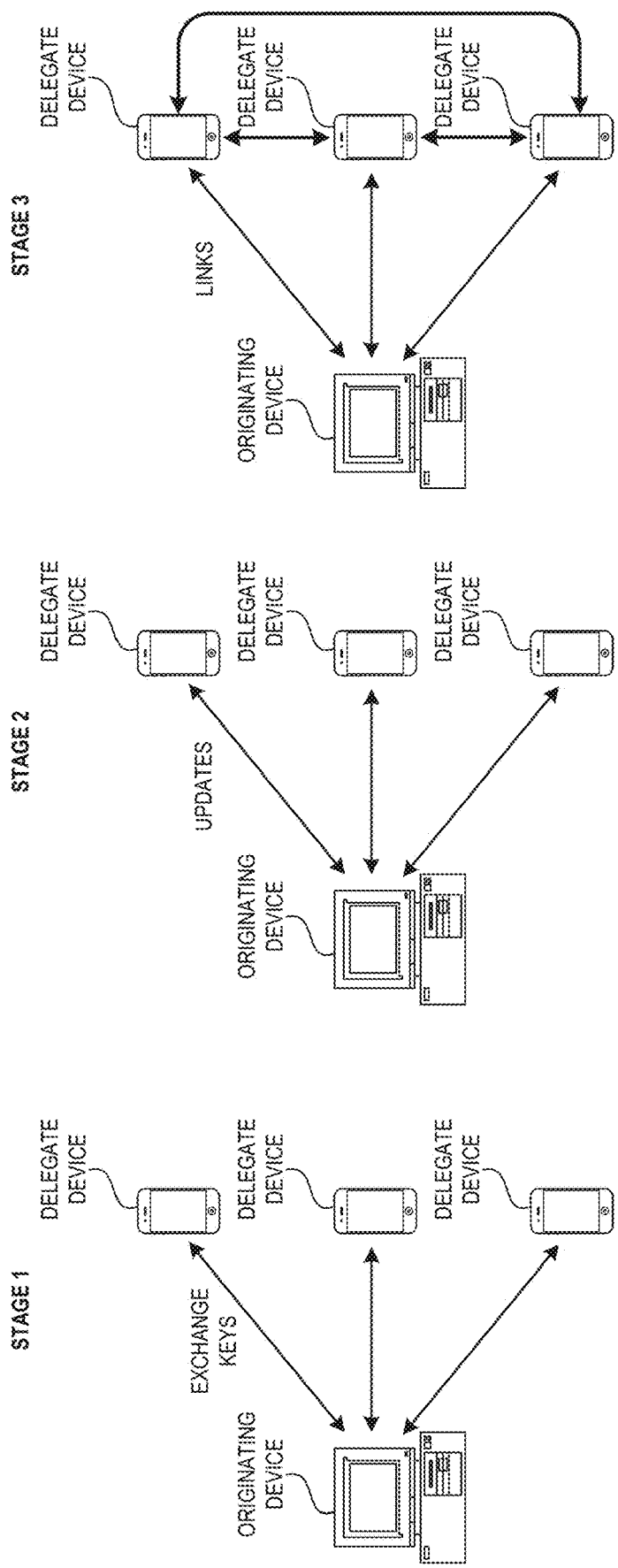
FIG. 9 is a block diagram that illustrates a setup process of onboarding procedures according to some embodiments of the present disclosure.

FIG. 9 is a block diagram that depicts a setup process for onboarding procedures according to some embodiments of the present disclosure. Stage 1 shows that an originating device can perform a secure exchange of public keys with delegate devices via the usage of the STPC mechanism of FIG. 6. All communication after this can be encrypted and signed. Stage 2 shows that after linking with the delegate devices, the originating device can send the full on-boarding information to the delegate devices which will link them to each other in stage 3. The completion illustrated in stage 3 results in all devices exchanging their public keys with each other in a secure manner. The group including the originating device and delegate devices are then ready to securely communicate key shards.

Figure 10:
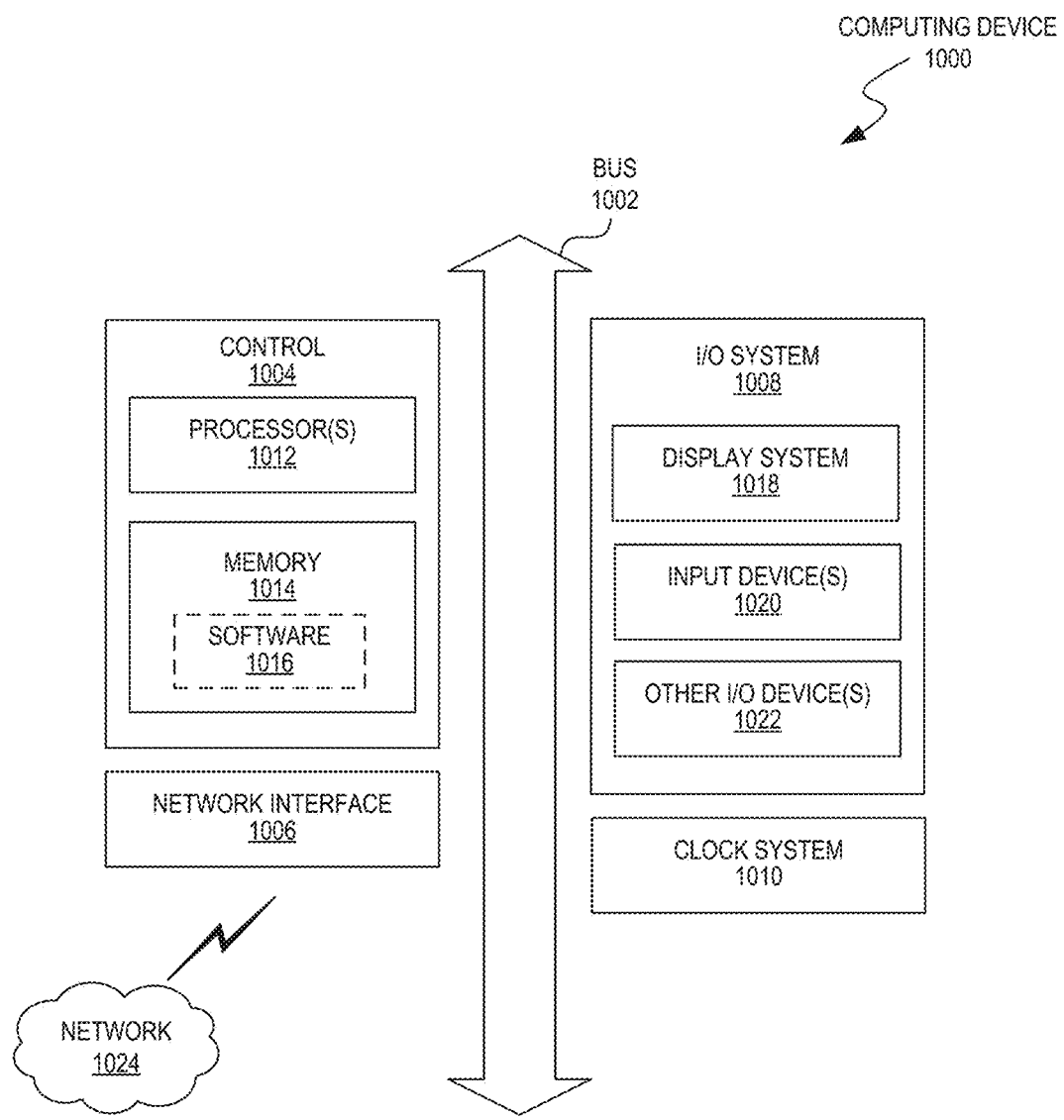
FIG. 10 is a block diagram of a computing device operable to implement aspects of the disclosed embodiments.

FIG. 10 is a block diagram of a computing device 1000 operable to implement aspects of the disclosed embodiments. The computing device 1000 may be a generic computer or specifically designed to carry out features of the system 100. The computing device 1000 may be an originating device, a relay server, or a delegate device embodied as, for example, a system-on-chip (SOC), a single-board computer (SBC) system, a server, a desktop or laptop computer, a kiosk, a mainframe, a mesh of computer systems, a handheld mobile device, or combinations thereof.

The computing device 1000 may be a standalone device or part of a distributed system that spans multiple networks, locations, machines, or combinations thereof. In some embodiments, the computing device 1000 operates as a server computer (e.g., relay server) or a client device (e.g., originating device, delegate device) in a client-server network environment, or as a peer machine in a peer-to-peer system. In some embodiments, the computing device 1000 may perform one or more steps of the disclosed embodiments in real-time, in near real-time, offline, by batch processing, or combinations thereof.

As shown, the computing device 1000 includes a bus 1002 operable to transfer data between hardware components. These components include a control 1004 (i.e., processing system), a network interface 1006, an Input/Output (I/O) system 1008, and a clock system 1010. The computing device 1000 may include other components not shown or further discussed for the sake of brevity. One having ordinary skill in the art will understand any hardware and software included but not shown in FIG. 10.

The control 1004 includes one or more processors 1012 (e.g., central processing units (CPUs), application specific integrated circuits (ASICs), and/or field programmable gate arrays (FPGAs)) and memory 1014 (which may include software 1016). The memory 1014 may include, for example, volatile memory such as random-access memory (RAM) and/or non-volatile memory such as read-only memory (ROM). The memory 1014 can be local, remote, or distributed.

A software program (e.g., software 1016), when referred to as "implemented in a computer-readable storage medium," includes computer-readable instructions stored in a memory (e.g., memory 1014). A processor (e.g., processor 1012) is "configured to execute a software program" when at least one value associated with the software program is stored in a register that is readable by the processor. In some embodiments, routines executed to implement the disclosed embodiments may be implemented as part of operating system (OS) software (e.g., MICROSOFT WINDOWS, LINUX) or a specific software application, component, program, object, module or sequence of instructions referred to as "computer programs."

As such, the computer programs typically comprise one or more instructions set at various times in various memory devices of a computer (e.g., computing device 1000) and which, when read and executed by at least one processor (e.g., processor 1012), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 1014).

The network interface 1006 may include a modem or other interfaces (not shown) for coupling the computing device 1000 to other computers, for example, over the network 1024. The I/O system 1008 may operate to control various I/O devices, including peripheral devices such as a display system 1018 (e.g., a monitor or touch-sensitive display) and one or more input devices 1020 (e.g., a keyboard and/or pointing device). Other I/O devices 1022 may include, for example, a disk drive, printer, scanner, or the like. Lastly, the clock system 1010 controls a timer for use by the disclosed embodiments.

Operation of a memory device (e.g., memory 1014), such as a change in state from a binary to a binary zero (or vice versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the claims disclosed herein. Thus, the description is to be regarded as illustrative instead of limiting.

The invention claimed is:

1. A method comprising:
encrypting, at a first device, data with a symmetric key;
generating a plurality n of key shards based on the key such that the symmetric key can be reconstituted from the plurality n of key shards;
encrypting the plurality n of key shards with respective public keys of a plurality of devices, each device also having a corresponding private key to decrypt the encrypted shard;
receiving, at the plurality of devices, the encrypted plurality n key shards so that the plurality of n key shards remain encrypted with the respective public keys of the plurality of devices;
storing the plurality n of encrypted key shards in a plurality of non-volatile computer memories at respective devices of the plurality of devices such that the encrypted data is secured because the first device is incapable of decrypting the encrypted data due to an absence of the symmetric key;
wherein the plurality of key shards is a first set of key shards, and the plurality of devices is a first combination of devices;
generating a second set of key shards from a first minimum threshold number of the first set of key shards;
distributing the second set of key shards among a second combination of devices; and
generating a third set of key shards from the second set of key shards such that the symmetric key is capable of being reconstituted based on a second minimum threshold number of the third set of key shards of the second combination of devices:
wherein the second minimum threshold number is different than the first minimum threshold number; and
reconstituting the symmetric key with the second minimum threshold number of the third set of key shards of the second combination of devices and decrypting the encrypted data with the reconstituted key.

2. The method of claim 1, wherein a threshold m of the plurality n of key shards are required to reconstitute the symmetric key.

3. The method of claim 1, wherein each of the plurality n of devices is physically separate from each other, and the plurality of devices includes the first device.

4. The method of claim 1, wherein storing the plurality of key shards comprises:
establishing a communications link between the first device and the plurality n of devices to communicate respective key shards; and
communicating a key shard over the communications link to at least one of the plurality devices.

5. The method of claim 1, wherein the first device belongs to a single user that is authorized to access the encrypted data, and at least one of the plurality n of devices belongs to a user that is not authorized to access the encrypted data.

6. The method of claim 1, wherein the first device has a public key for each of the plurality n of devices that each have a counterpart private key, and the storing comprises:
encrypting each key shard of each device with a respective public key such that a plurality n of encrypted key shards is distributed to the plurality n of devices, and each device can decrypt its encrypted shard when requested to do so and return the decrypted shard to a requestor.

7. The method of claim 2, further comprising:
in response to a request to access the encrypted data, collecting the threshold m of the plurality n of key shards from the plurality of devices;
reconstituting the symmetric key from the collected in of plurality n of key shards; and
decrypting the encrypted data with the reconstituted symmetric key.

8. The method of claim 1, wherein the plurality of key shards is output generated by processing the symmetric key as input to a threshold cryptography data-sharing scheme.

9. The method of claim 1, wherein the plurality of key shards are respective portions of the symmetric key that collectively constitute the symmetric key.

10. The method of claim 1, wherein the second combination of devices includes at least some of the first combination of devices.

11. The method of claim 1, wherein the first minimum threshold number equals the second minimum threshold number and the symmetric key is capable of being reconstituted based on the first minimum threshold number of the first set of key shards.

12. The method of claim 1, wherein a total number of the second set of key shards is different than a total number of the first set of key shards.

13. The method of claim 1, further comprising:
generating a fourth set of key shards from a third minimum threshold number of the third set of key shards;
distributing the fourth set of key shards among a third combination of devices; and
generating a fifth set of key shards from the fourth set of key shards such that the symmetric key is capable of being reconstituted based on a fourth minimum threshold number of the fifth set of key shards of the third combination of devices.

14. The method of claim 1, wherein the storing stores the n encrypted key shards and the encrypted data in a single file accessible to the first device.

15. The method of claim 1, wherein the public keys are stored on the first device and wherein the encrypting the plurality of n key shards is performed by the first device.

16. The method of claim 7, wherein the collecting includes causing m of the plurality n devices to decrypt m key shards using their respective private keys.

17. The method of claim 7, further comprising deleting the reconstituted key after completing decryption of the encrypted data.

18. The method of claim 7, further comprising rotating the symmetric key.

19. The method of claim 18, wherein the rotating comprises reconstituting the symmetric key, decrypting the encrypted data with the reconstituted symmetric key, generating a second symmetric key, encrypting the data with the second symmetric key, generating key shards for the second symmetric key, encrypting the key shards and distributing the key shards.

20. A computing device comprising:
a processor: and one or more memories that include data objects and instructions that, when executed by the processor, cause the computing device to:
encrypting, at a first device, data with a symmetric key;
generating a plurality n of key shards based on the symmetric key such that the symmetric key can be reconstituted from the plurality n of key shards;

encrypting the plurality n of key shards with respective public keys of a plurality of devices, each device also having a corresponding private key to decrypt the encrypted shard;

receiving, at the plurality of devices, the dually encrypted plurality n key shards so that the plurality of n key shards remain encrypted with the respective public keys of the plurality of devices;

storing the plurality n of encrypted key shards in a plurality of non-volatile computer memories of respective devices of the plurality of devices such that the encrypted data is secured because the first device is incapable of decrypting the encrypted data due to an absence of the symmetric key;

wherein the plurality of key shards is a first sett of key shards. and the plurality of devices is a first combination of devices;

generating a second set of key shards from a first minimum threshold number of the first set of key shards;

distributing the second set of key shards among a second combination of devices; and generating a third set of key shards from the second set of key shards such that the symmetric key is capable of being reconstituted based on a second minimum threshold number of the third set of key shards of the second combination of devices;

wherein the second minimum threshold number is different than the first minimum threshold number; and reconstituting the symmetric key with the second minimum threshold number of the third set of key shards of the second combination of devices and decrypting the encrypted data with the reconstituted key.

21. The computing device of claim 20, wherein a threshold m of the plurality n of key shards are required to reconstitute the symmetric key.

22. The computing device of claim 20, wherein the first device has a public key for each of the plurality of devices that each have a counterpart private key, and distributing the plurality of key shards to the plurality of devices comprises:
encrypting each key shard of each device with a respective public key such that a plurality of encrypted key shards is distributed to the plurality of devices, and each device can decrypt its encrypted shard when requested to do so and return the decrypted shard to a requestor.

23. A non-transitory computer-readable medium having stored thereon instructions to cause a computer processor to execute a method, the method comprising:

encrypting, at a first device, data with a symmetric key;

generating a plurality n of key shards based on the symmetric key such that the symmetric key can be reconstituted from the plurality n of key shards;

encrypting the plurality n of key shards with respective public keys of a plurality of devices, each device also having a corresponding private key to decrypt the encrypted shard;

receiving, at the plurality of devices, the dually encrypted plurality n key shards so that the plurality of n key shards remain encrypted with the respective public keys of the plurality of devices;

storing the plurality n of encrypted key shards in a plurality of non-volatile computer memories of respective devices of the plurality of devices such that the encrypted data is secured because the first device is incapable of decrypting the encrypted data due to an absence of the symmetric key;

wherein the plurality of key shards is a first set of key shards, and the plurality of devices is a first combination of devices; generating a second set of key shards from a first minimum threshold number of the first set of key shards;

distributing the second set of key shards among a second combination of devices; and generating a third set of key shards from the second set of key shards such that the symmetric key is capable of being reconstituted based on a second minimum threshold number of the third set of key shards of the second combination of devices;

wherein the second minimum threshold number is different than the first minimum threshold number; and reconstituting the symmetric key with the second minimum threshold number of the third set of key shards of the second combination of devices and decrypting the encrypted data with the reconstituted key.

* * * * *